P. TRIMBLE.
REVERSIBLE PLOW.
APPLICATION FILED MAR. 6, 1911.
1,027,451.
Patented May 28, 1912.
2 SHEETS—SHEET 1.
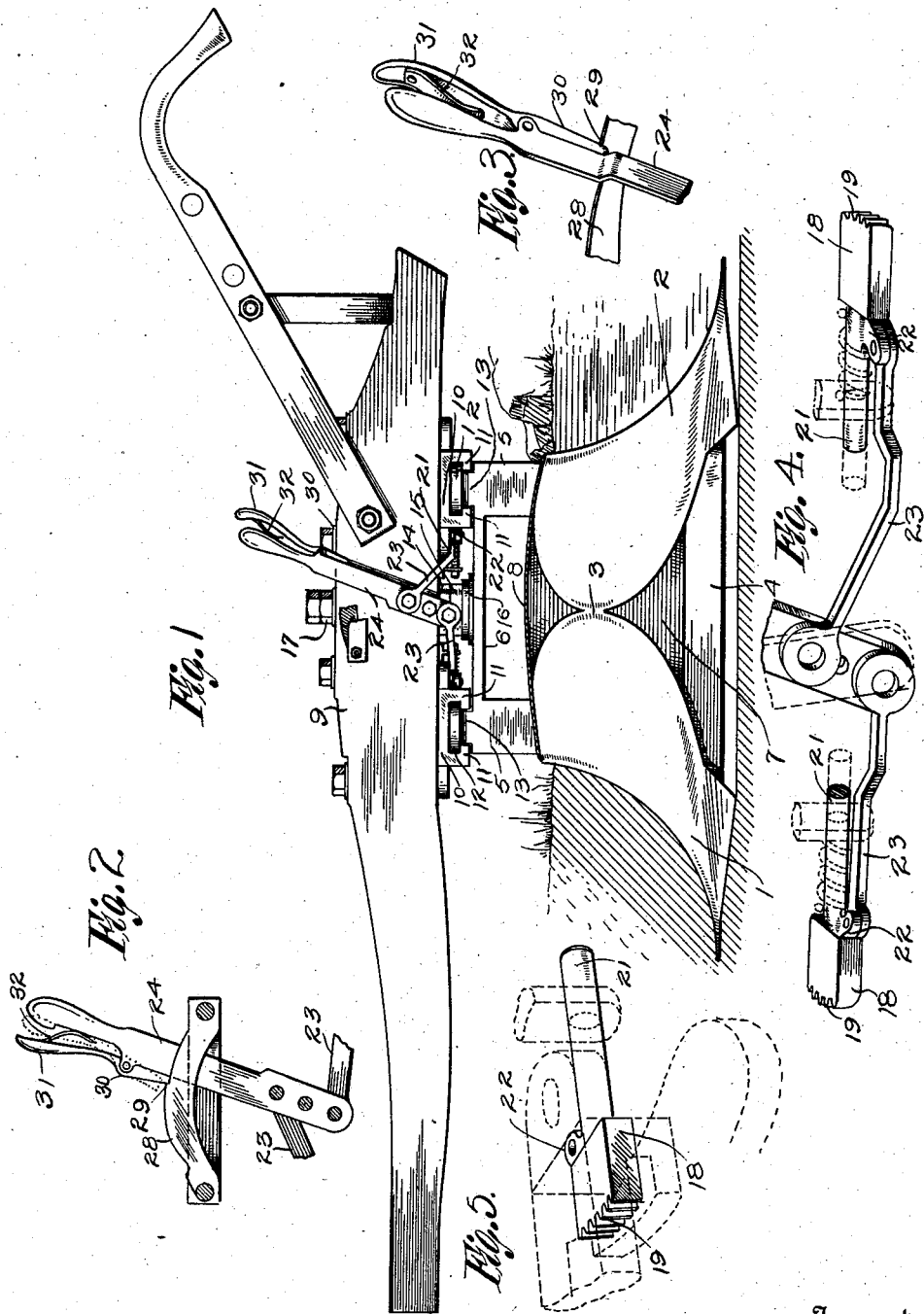
Witnesses
Robert M. Sutphen
E. W. Cady
Inventor
PORTER TRIMBLE
By E. E. Vrooman,
Attorney.

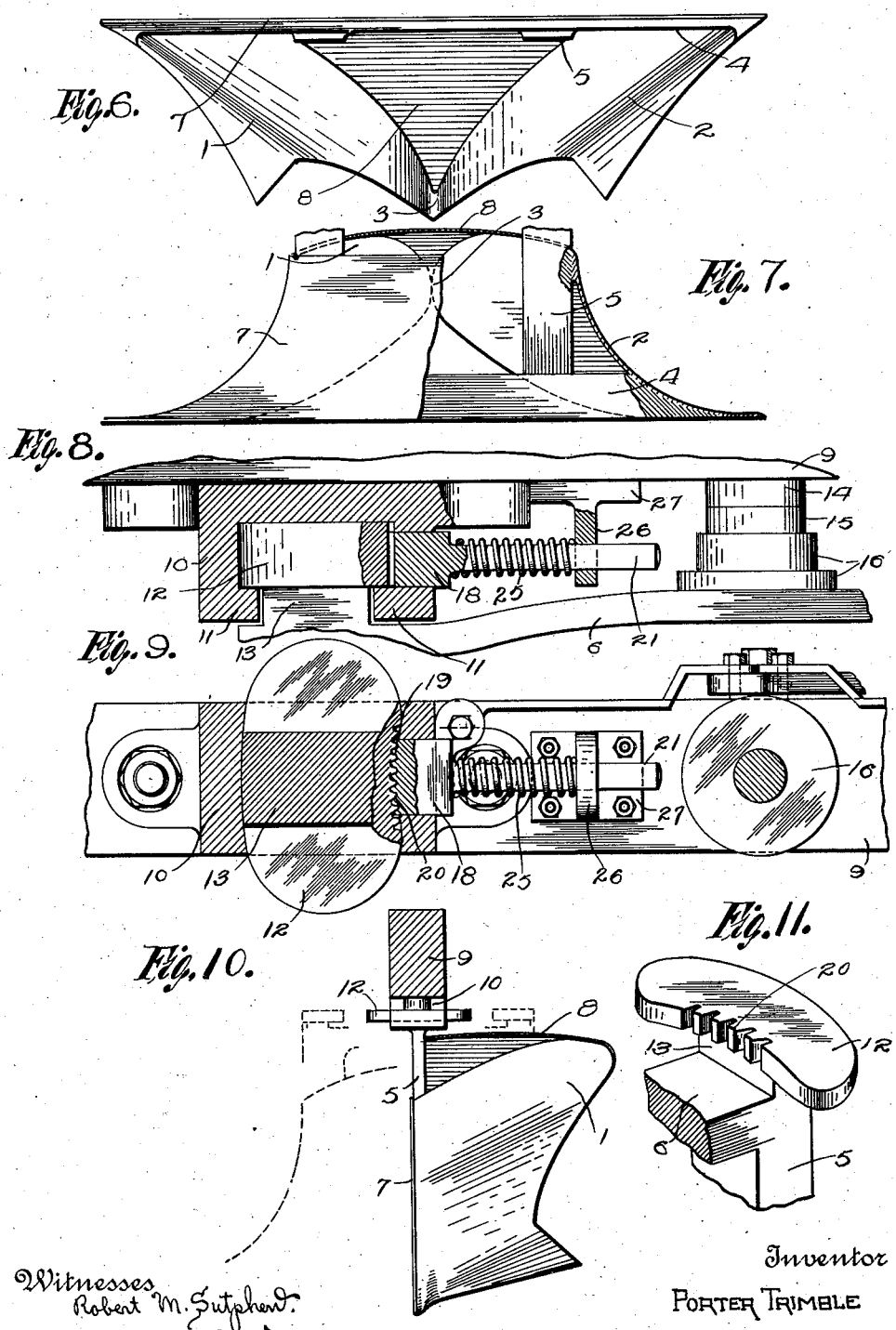

UNITED STATES PATENT OFFICE.

PORTER TRIMBLE, OF EUREKA, CALIFORNIA.

REVERSIBLE PLOW.

1,027,451.             Specification of Letters Patent.       Patented May 28, 1912.

Application filed March 6, 1911. Serial No. 612,542.

*To all whom it may concern:*

Be it known that I, PORTER TRIMBLE, a citizen of the United States, residing at Eureka, in the county of Humboldt and State of California, have invented certain new and useful Improvements in Reversible Plows, of which the following is a specification, reference being had therein to the accompanying drawing.

This invention relates to that class of plows known as hill side plows which are characterized by having a pair of plows consisting of a right and left hand plow, which are susceptible of adjustment, and are so arranged that the plow beam may be reversed without disturbing the plow in the furrow.

Plows of this kind are constructed with a pair of right and left hand plows mounted on a frame on which is supported a plow beam and handles which can be turned around with the team without changing the position of the plows. By means of this construction plowing can be done on sloping land, the furrow being turned down hill all the time. In plowing level land the person driving the plow can begin on one side of the field and plow back and forth until the other side is reached without having a dead furrow or back furrow in the field.

The object of this invention is to provide an improved plow of this kind which can be effectively operated, which will not clog from the dirt turned up by the share and by means of which the plow beam may be readily reversed when the end of the furrow is reached.

Referring to the accompanying drawings:—Figure 1 is a side view of a hill side plow constructed in accordance with this invention. Fig. 2 is an enlarged detail view of a part of the mechanism for locking the plow beam in position. Fig. 3 is an enlarged detail view of a portion of the device shown in Fig. 2 on the opposite side thereon. Fig. 4 is an enlarged detail view of a portion of the means for locking the plow beam in position. Fig. 5 is an enlarged detail view in perspective of a portion of the locking means shown in Fig. 4. Fig. 6 is a view of one side of the pair of plows in inverted position. Fig. 7 is a side view of the pair of plows with the back side thereof partly broken away. Fig. 8 is an enlarged detail view in longitudinal section of a portion of the means for locking the plow beam of the plows. Fig. 9 is a plan view in horizontal section of a portion of the means for locking the plow beam of the plows. Fig. 10 is an end view partly in cross section of the plows and their support showing a diagrammatic view in dotted lines of the plows in adjusted position. Fig. 11 is an enlarged detail view in perspective of a portion of the means for locking the plow beam to the plows.

In carrying out the invention two ordinary plow shares 1 and 2 are provided which are right and left hand plow shares respectively united back to back at the point 3 and mounted on a rectangular frame consisting of the bottom cross bar 4, the vertical uprights 5 projecting above the plow shares and the top cross bar 6.

In order to prevent the earth from accumulating between the plows a thin sheet of metal 7 is mounted on the back of the rectangular frame and extends from the front edge of one of the plows to the other, and a thin sheet of metal 8 on the top of the plow shares, thereby preventing the earth from clogging the plows as the furrow is cut.

9 indicates a plow beam which is supported on the rectangular frame and is connected therewith by plates 10, each having a slot transverse to the plow beam, and a pair of inturned flanges 11 which engage a slidable oblong head 12 more particularly shown in Figs. 9 and 11, said heads being each mounted on a neck 13 on the upper end of each upright 5.

The rectangular frame on which the plow shares are mounted is pivotally connected with the plow beam by means of a rod or pin connected at its lower end to the top cross bar 6 of the rectangular frame and projecting up through a circular plate 14 secured to the under side of the plow beam, and a circular plate 15 rotatable upon the plate 14 and held in place by a couple of circular plates 16 resting on the cross bar 6 and serving to hold the plates 14 and 15 together. The rod just referred to which extends through the plow beam and the plates 14 and 15 is held in place by means of a pair of nuts 17 screwed to its upper end and bearing on the upper side of the plow beam. In order to lock the plow beam to the rectangular frame and also to permit of its being adjusted to an angle thereon or to be entirely swung around to the opposite longitudinal position the following means is provided. A plate 18 with teeth 19 is slidably mounted in an opening in each of the plates 10 and in the inner wall thereof, the teeth 19 of each of said plates 18 meshing with corresponding teeth 20 in each of the heads 12, more particularly as shown in Fig. 9, and serving to hold the plow beam in locked position on the rectangular frame. Each of the plates 18 is mounted an the end of a rod 21 having a lateral lug or projection 22 to which is pivoted one end of a lever arm 23 pivoted at its other end to a manually operated lever 24 which is hinged to the plow beam 9. The plates 18 are each normally held in engagement with a plate 12 by means of a coil spring 25 which encircles each of the rods 21 and is located between the plate 18 and the lug 26 through which the rod 21 is slidable, said lug 26 depending from a plate 27 to the under side of the plow beam. The manually operated lever 24 projects past a guide strap 28 secured to the side of the plow beam and having a notch 29 which is adapted to engage the end 30 of a hand lever 31 controlled by a spring 32 and pivoted to the upper end of the lever 24. By means of this device when the person driving the plow desires to unlock the plow beam from the rectangular frame the end 30 of the lever 31 may be released from the share 29 by pulling back on the lever 24 with the upper end of the lever 31 and holding it against the upper end of the lever 24. The lever 24 is then swung forward to release the plates 18 from the plates 12 and when the plow beam has been reversed by pulling back the lever to the normal position shown in Figs. 2 and 3 the lever 31 will snap into locked position with the shoulder 29.

It will be seen that by means of this invention the plow beam may be readily released from its locked position and swung around to the opposite longitudinal position without disturbing the plow shares and if desired the plow beam may be locked at any angle by swinging it from the longitudinal line over the plows to an angle thereto as shown in the diagrammatic view in Fig. 10, the plates 18 locking with the plates 12 and holding the plow beam in such angular position.

Having described the invention, what I claim is:—

In a plow of the kind described, a frame including uprights, and a bar connecting the upper ends thereof, a plow beam pivoted centrally of said bar, projections extending upwardly from said bar, an arcuate head on each of said projections having its concaved side concentric with the axis of the pivot, said heads each projecting entirely around the periphery of the respective projection from the bar, plates mounted beneath said plow beam, and provided with downwardly projecting spaced portions to receive the heads, said downwardly projecting portions having inturned lips extending beneath the heads whereby strain on the pivot is relieved, rack teeth formed on the concaved side of said heads, a pawl slidably mounted in one of the downwardly projecting portions and engageable with said rack teeth, means normally urging said pawl in engagement with the rack teeth, and means to retract said pawl.

In testimony whereof I hereunto affix my signature in presence of two witnesses.

PORTER TRIMBLE.

Witnesses:
 A. SNIDER,
 E. L. WARD.

---

Copies of this patent may be obtained for five cents each, by addressing the "Commissioner of Patents, Washington, D. C."